United States Patent [19]

Sterner

[11] Patent Number: 4,572,622
[45] Date of Patent: Feb. 25, 1986

[54] DIRECT OPPOSITE REVERSE REFRACTOR

[76] Inventor: David Sterner, 117 NE. 12th #1, Portland, Oreg. 97232

[21] Appl. No.: 636,074

[22] Filed: Jul. 30, 1984

Related U.S. Application Data

[63] Continuation of Ser. No. 415,579, Sep. 7, 1982.

[51] Int. Cl.⁴ ............................................. G02B 3/02
[52] U.S. Cl. ..................................... 350/432; 350/417
[58] Field of Search ................ 350/417, 418, 432, 433

[56] References Cited

U.S. PATENT DOCUMENTS 2,490,873  4/1946  Johnson .............................. 350/418
2,979,997  9/1955  Bertsch .............................. 350/480

Primary Examiner—John K. Corbin
Assistant Examiner—P. M. Dzierzynski
Attorney, Agent, or Firm—Jack E. Day

[57] ABSTRACT

This invention consists of a geometrically patterned lens for primary uses in the field of image projection and refraction.

4 Claims, 3 Drawing Figures

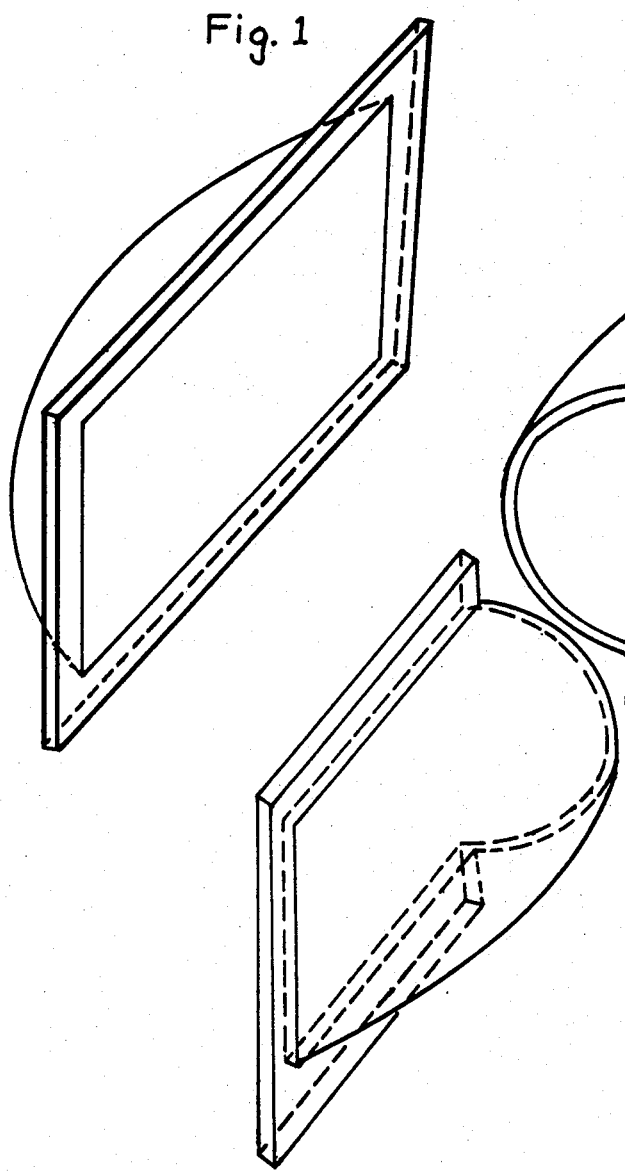
Fig. 1
Fig. 2
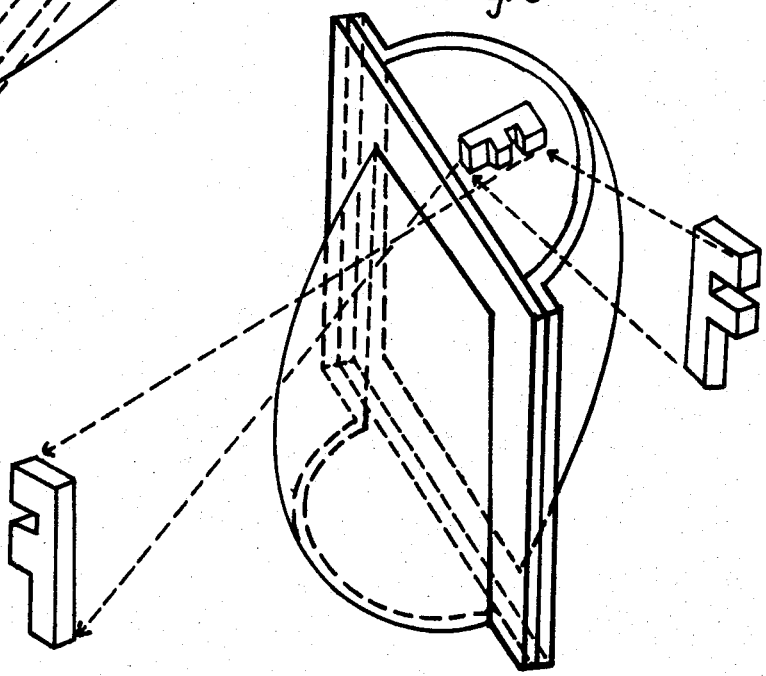
Fig. 3

DIRECT OPPOSITE REVERSE REFRACTOR

This application is a continuation of application Ser. No. 415,579, filed Sept. 7, 1982.

SUMMARY OF THE INVENTION

Briefly, this invention is a geometrically shaped lens capable of casting an image upright and unreversed, enlarged or reduced and allows the user control of prismatic color separations for improvements in photographic processes and other applications in which image projection is required.

Geometrically the invention can best be described as a lens in which both faces arc to a crest and diminish to a flat plane at directly opposing vertical and parallel coordinates of one another in reverse positioning.

Also considered, the invention is a constructional technique to achieve the shape of the invention, beginning with a square or rectangular bordered PLEXIGLAS bubble. The bubble is severed equilaterally forming two directly opposing halves. These halves are placed back to back and reverse to one another and rejoined forming a singular, hollow shape open at both ends. One of the openings is then sealed, forming a bottom; and the invention is filled with a refractive material such as water.

BRIEF DESCRIPTION OF THE DRAWINGS

A better understanding of the constructional technique and unique shape formed thereby may be had by viewing the drawings in which:

FIG. 1 is a perspective view of a rectangular bordered, PLEXIGLAS bubble.

FIG. 2 is a perspective view displaying the manner in which the bubble is to be equilaterally severed and one of the halves has been turned in reverse positioning to its directly opposing counterpart.

FIG. 3 is a perspective view displaying both halves back to back and in reverse positioning to one another. Extension lines (F) represent individual rays of light and their behavior as they pass through the invention and are refracted.

DETAILED DESCRIPTION OF THE INVENTION

Because previous lenses are unable to cast images upright and unreversed, mirrors and transparent film negatives are required in the process of developing a positive image reproduction.

When properly focused as seen in FIG. 3 of the drawing, this invention will cast a true positive image without the aid of film, mirrors or other reversal devices.

Because the need for a film negative has been eliminated, so has its processing time, cost and the highly dangerous, complex chemical compounds used in its development such as: (2-amino-5-diethylaminotolurne). It is a well known medical fact that contact with paraphenylene derivatives frequently cause metol poisoning.

In photographic processes where image enlargement is required, this invention eliminates the need for a photographic enlarger and other such devices as slide projectors and film negatives.

Because slide projectors and photographic enlargers have need of an artificial light source, filters and other such devices are needed to enable the printer to reproduce the shades and color tones as they originally appeared. Though prisms are able to separate light into its primary colors, they are unable to cast images due to the nature of their flat surfaces.

This invention allows the artist total control of prismatic color separation, unlike other achromatic refractors which are not entirely free of unwanted prismatic colors. With such added control of prismatic color separation greater than heretofore available, it is easy to see how an artist using this invention can produce many special effects, as well as a more color-correct, three-dimensional appearing photograph, in less time and at less expense than prior means and methods have allowed.

Unlike conventional focused images, refractions have no focal length therefore allowing uniform clarity of all subject matter.

Because the shape which is considered the invention is so novel, it is understandable that many advantageous uses could be attributed to its discovery as a lens as well as a geometric configuration.

The terms and expressions which have been employed in the foregoing specification are used used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A lens structure capable of casting an upright and unreversed image, comprising:
   a. an arcuately-shaped bubble of transparent material having a rectangularly-bordered base, wherein:
      1. said bubble is severed equilaterally, forming two directly opposing halves;
      2. said halves being placed in a back-to-back and reversed position with respect to each other, and being rejoined to form a skewed-barrel-shaped lens structure having an opening at each end; and
      3. one of said openings at said ends being sealed and said lens structure then being filled with a refractive liquid material, such that the surface of said refractive liquid material forms a flat reflective surface.

2. The lens structure of claim 1, wherein said transparent material is PLEXIGLAS.

3. The lens structure of claim 1, wherein said refractive liquid material is water.

4. The lens structure of claim 3, wherein said refractive liquid material is water.

* * * * *